R. N. ALLEN
Car Coupling.

No. 105,407.                    Patented July 19, 1870.

Witnesses:
A. W. Almqvist
Geo. N. Mabee

Inventor:
R. N. Allen
per Mmm &Co
Attorneys.

United States Patent Office.

RICHARD N. ALLEN, OF PITTSFORD, VERMONT.

Letters Patent No. 105,407, dated July 19, 1870.

IMPROVEMENT IN CAR-COUPLING.

The Schedule referred to in these Letters Patent and making part of the same.

*To all whom it may concern:*

Be it known that I, RICHARD N. ALLEN, of Pittsford, in the county of Rutland and State of Vermont, have invented a new and useful Improvement in Car-Coupling; and I do hereby declare that the following is a full, clear, and exact description thereof, which will enable others skilled in the art to make and use the same, reference being had to the accompanying drawing forming part of this specification, in which—

Similar letters of reference indicate corresponding parts.

Figure 1:
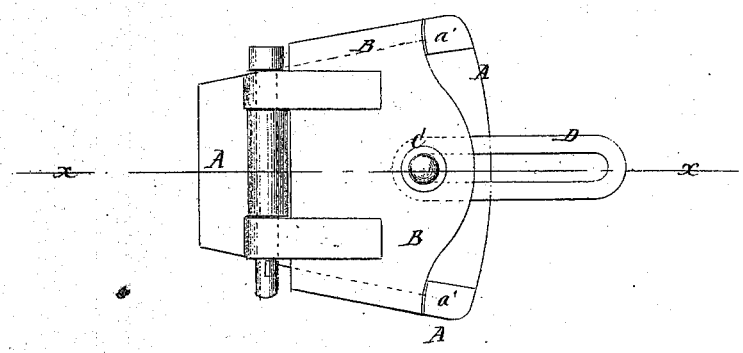
Figure 1 is a top view of a bumper-head, illustrating my improved coupling.
Figure 2:
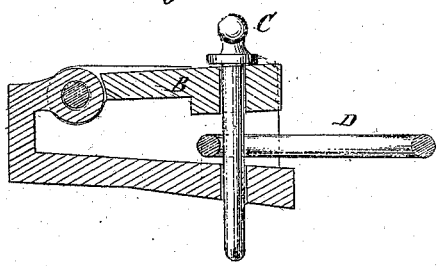
Figure 2 is a vertical longitudinal section of the same, taken through the line $x$ $x$, fig. 1.

This invention has for its object improvement in that class of car-couplings in which the bumpers or draw-heads have a hinged top piece or cover; and The invention, in the present case, consists in so constructing the parts that the hinged cover shall abut against projections on the sides of the bumper-head, and thus the draft-strain of the link on the hinge be wholly or mainly removed.

A is the bumper-head, the bottom and sides of which are constructed in the ordinary manner.

The upper part or top plate B of the bumper-head A is made separate, and is securely and strongly hinged at its rear edge to the solid rear part of the bumper-head A, and its ends fit into notches in the upper edges of the sides of the bumper-head A, so that the draft-strain upon the hinged plate B may be sustained by the solid forward parts $a'$ of the said sides, which may be easily made of any desired strength.

C is the ordinary coupling-pin, which is passed down through a hole in the hinged top plate B, and through a hole in the bottom of the bumper-head A, in the same manner as in an ordinary bumper-head.

D is the ordinary coupling-link, the ends of which enter the bumper-head between the bottom of said bumper-head and the hinged plate B, and through which the coupling-pin C passes in the same manner as in the ordinary coupling.

In coupling and uncoupling cars provided with this coupling the coupling-pin C is withdrawn, the hinged plate B is turned back, and the link may be conveniently inserted and removed while the cars are standing together upon the track.

Having thus described my invention,

I claim as new and desire to secure by Letters Patent—

The arrangement, with the bumper-head A, of the plate B and the ears or abutments $a'$, to receive the draft-strain (on plate B) applied through the link D and pin C, and thereby relieve the hinge, as shown and described.

The above specification of my invention signed by me this 4th day of May, 1870.

RICHARD N. ALLEN.

Witnesses:
GEO. W. MABEE,
JAMES T. GRAHAM.